United States Patent
Totsuka

(10) Patent No.: US 10,596,836 B2
(45) Date of Patent: Mar. 24, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Atsushi Totsuka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/214,863

(22) Filed: Dec. 10, 2018

(65) Prior Publication Data
US 2019/0184716 A1    Jun. 20, 2019

(30) Foreign Application Priority Data
Dec. 20, 2017 (JP) ................. 2017-243380

(51) Int. Cl.
| | | |
|---|---|---|
| *B41J 11/00* | (2006.01) | |
| *B41J 2/21* | (2006.01) | |
| *B41M 3/06* | (2006.01) | |
| *G06T 1/00* | (2006.01) | |
| *B41J 3/407* | (2006.01) | |
| *B33Y 50/00* | (2015.01) | |
| *B33Y 10/00* | (2015.01) | |
| *B29C 64/386* | (2017.01) | |
| *B29C 64/112* | (2017.01) | |

(52) U.S. Cl.
CPC ........... *B41J 11/002* (2013.01); *B29C 64/112* (2017.08); *B29C 64/386* (2017.08); *B33Y 10/00* (2014.12); *B33Y 50/00* (2014.12); *B41J 2/21* (2013.01); *B41J 3/4073* (2013.01); *B41M 3/06* (2013.01); *G06T 1/0007* (2013.01); *B41J 2/2114* (2013.01); *B41J 2/2132* (2013.01)

(58) Field of Classification Search
CPC . B41J 11/002; B41J 3/4073; B41J 2/21; B41J 2/2132; B41J 2/2114; B29C 64/112; B29C 64/386; B33Y 10/00; B33Y 50/00; G06T 1/0007; B41M 3/06
See application file for complete search history.

(56) References Cited

U.S. PATENT DOCUMENTS

2018/0304534 A1* 10/2018 Bajaj ....................... B24B 37/26

FOREIGN PATENT DOCUMENTS

JP         2004-299058 A    10/2004

* cited by examiner

*Primary Examiner* — Bradley W Thies
(74) *Attorney, Agent, or Firm* — Canon USA, Inc. IP Division

(57) ABSTRACT

An information processing apparatus generates data for forming a layer of ink to be cured by being irradiated with an ultraviolet ray, on an uneven portion formed on a recording medium using ink to be cured by being irradiated with an ultraviolet ray, and the information processing apparatus includes an acquisition unit configured to acquire first data that has information corresponding to a depth of a groove to be generated on a surface of the uneven portion in a case where the uneven portion is formed on the recording medium, and a generation unit configured to generate second data that represents a number of lamination times of ink or a recording amount of ink for forming the layer of ink, based on the first data.

20 Claims, 13 Drawing Sheets

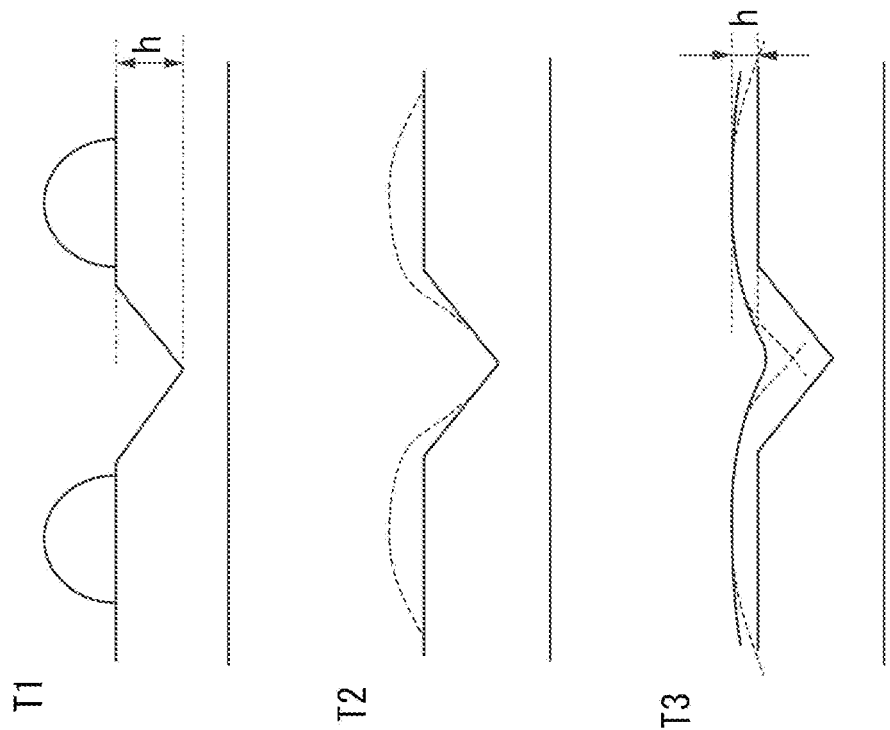

| NUMBER OF PASSES | HEIGHT | NUMBER OF LAMINATED LAYERS |
|---|---|---|
| 4 | 50 | 0 |
| 4 | 100 | 2 |
| ... | ... | ... |
| 4 | 2000 | 25 |
| 8 | 10 | 0 |
| 8 | 100 | 2 |
| ... | ... | ... |
| 8 | 2000 | 12 |
| 16 | 50 | 0 |
| 16 | 100 | 1 |
| ... | ... | ... |
| 16 | 2000 | 5 |

INFORMATION PROCESSING APPARATUS, INFORMATION PROCESSING METHOD, AND STORAGE MEDIUM

BACKGROUND OF THE INVENTION

Field of the Invention

The present disclosure generally relates to an information processing technology and more particularly relates to an information processing technology for forming an uneven portion on a storage medium.

Description of the Related Art

As a method for forming a desired uneven portion or a three-dimensional object, a method for reducing a material by using a carving machine and a method for laminating layers of a material such as curable resin or gypsum have been conventionally known. In a case where an uneven portion or three-dimensional object such as a relief or a figure formed by the above-described method is used for a purpose such as an ornamental purpose, shape characteristics such as sharpness and smoothness of the shape thereof greatly affects an appearance or impression (a texture). Japanese Patent Application Laid-Open No. 2004-299058 discusses a method for forming an uneven portion and a three-dimensional object by an inkjet recording system.

In Japanese Patent Application Laid-Open No. 2004-299058, an uneven portion is formed by discharging ink drops from a plurality of recording heads of a printer and laminating the ink drops. In an inkjet printer, a streak may be generated in a direction of movement of a recording head during ink discharge. The streak will be hereinafter referred to as a banding. There is such an issue that, when an uneven portion is formed using the inkjet printer, the above-described banding also appears as a horizontal groove in a moving direction of the recording head.

SUMMARY OF THE INVENTION

The present disclosure is at least directed to processing for inhibiting a banding that appears when an uneven portion is formed on a recording medium.

According to an aspect of the present disclosure, an information processing apparatus generates data for forming a layer of ink to be cured by being irradiated with an ultraviolet ray, on an uneven portion formed on a recording medium using ink to be cured by being irradiated with an ultraviolet ray, and the information processing apparatus includes an acquisition unit configured to acquire first data that has information corresponding to a depth of a groove to be generated on a surface of the uneven portion in a case where the uneven portion is formed on the recording medium, and a generation unit configured to generate second data that represents a number of lamination times of ink or a recording amount of ink for forming the layer of ink, based on the first data, wherein the layer of ink is a layer to be formed based on a condition that an elapsed time from discharge to curing of ink is longer than an elapsed time from discharge to curing of ink in a case where the uneven portion is formed.

Further features of the present disclosure will become apparent from the following description of exemplary embodiments with reference to the attached drawings.

BRIEF DESCRIPTION OF THE DRAWINGS

FIGS. 5A and 5B illustrate schematic diagrams of an effect of a leveling layer formed on an uneven portion.

DESCRIPTION OF THE EMBODIMENTS

Exemplary embodiments of the present disclosure will be described in detail below with reference to the drawings. Each component described in these exemplary embodiments is only an example, and the scope of the present disclosure is not limited thereto.

In a first exemplary embodiment, a banding is reduced by leveling. The banding is generated when an uneven portion is formed using an inkjet printer.

Hardware Configuration of Information Processing Apparatus 1

Figure 1:
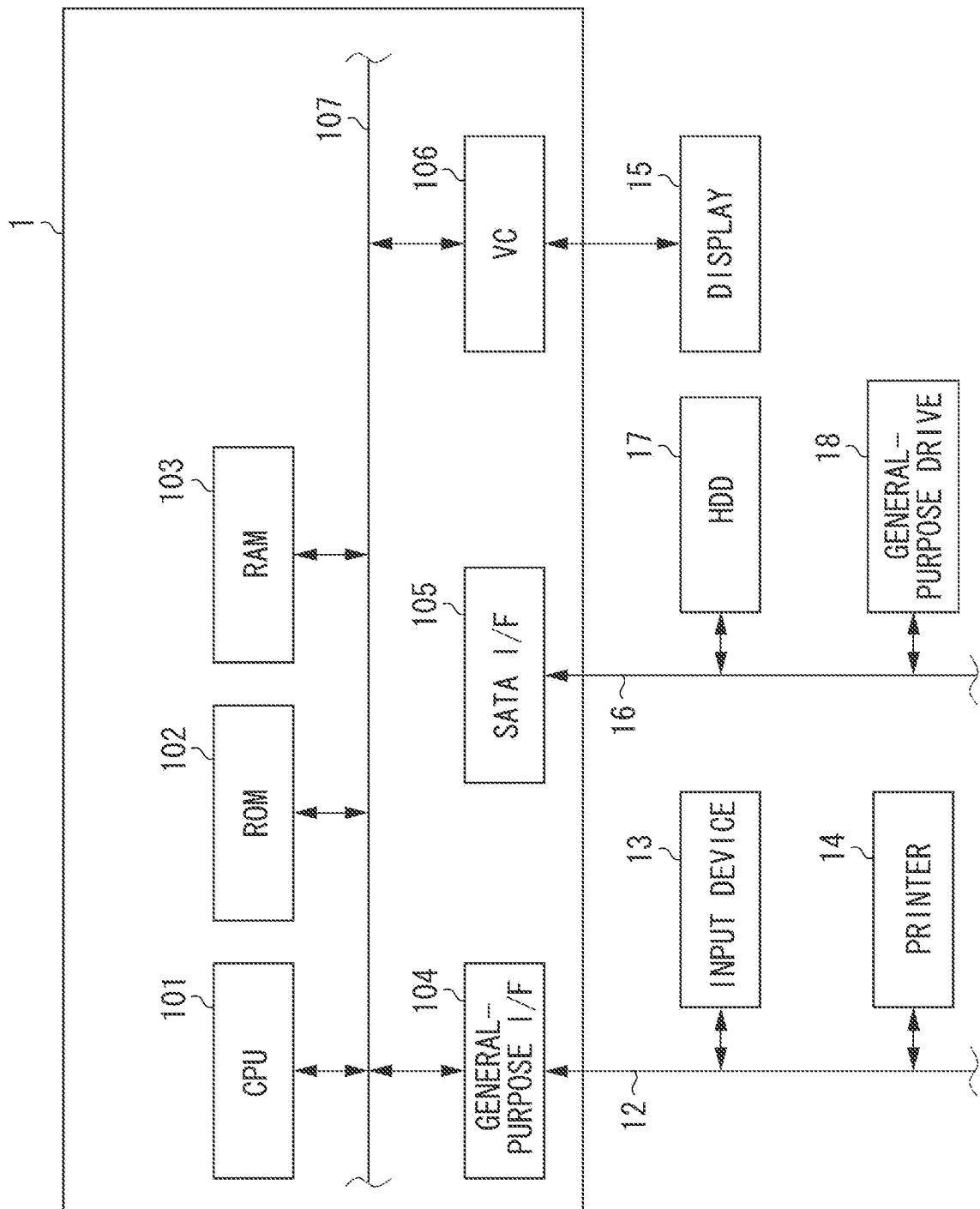
FIG. 1 is a block diagram illustrating a hardware configuration of an information processing apparatus.

FIG. 1 illustrates a hardware configuration example of an information processing apparatus 1. The information processing apparatus 1 is, for example, a computer. The information processing apparatus 1 includes a central processing unit (CPU) 101, a read only memory (ROM) 102, a random access memory (RAM) 103, a general-purpose interface (I/F) 104, a serial advanced technology attachment (serial ATA) (SATA) I/F 105, and a video card (VC) 106. The CPU 101 executes an operating system (OS) and various programs stored in components such as the ROM 102 and a hard disk drive (HDD) 17, by using the RAM 103 as a work memory. Further, the CPU 101 controls each configuration via a system bus 107. The CPU 101 executes a program code loaded from a component such as the ROM 102 or the HDD 17 into the RAM 103, thereby implementing processing based on a flowchart to be described below. Input devices 13 such as a mouse and a keyboard as well as a printer 14 are connected to the general-purpose I/F 104 via a serial bus 12. A general-purpose drive 18 that performs reading and writing of the HDD 17 and various storage media is connected to the SATA I/F 105 via a serial bus 16. The CPU 101 uses various storage media mounted in the HDD 17 and the general-purpose drive 18, as storage locations for various pieces of data. A display 15 is connected to the VC 106. The CPU 101 displays a user interface (UI) provided by a program at the display 15, and receives input information that represents a user instruction obtained via the input device 13. The information processing apparatus 1 may be included in an apparatus such as a printer 14.

Configuration of Printer 14

Figure 3:
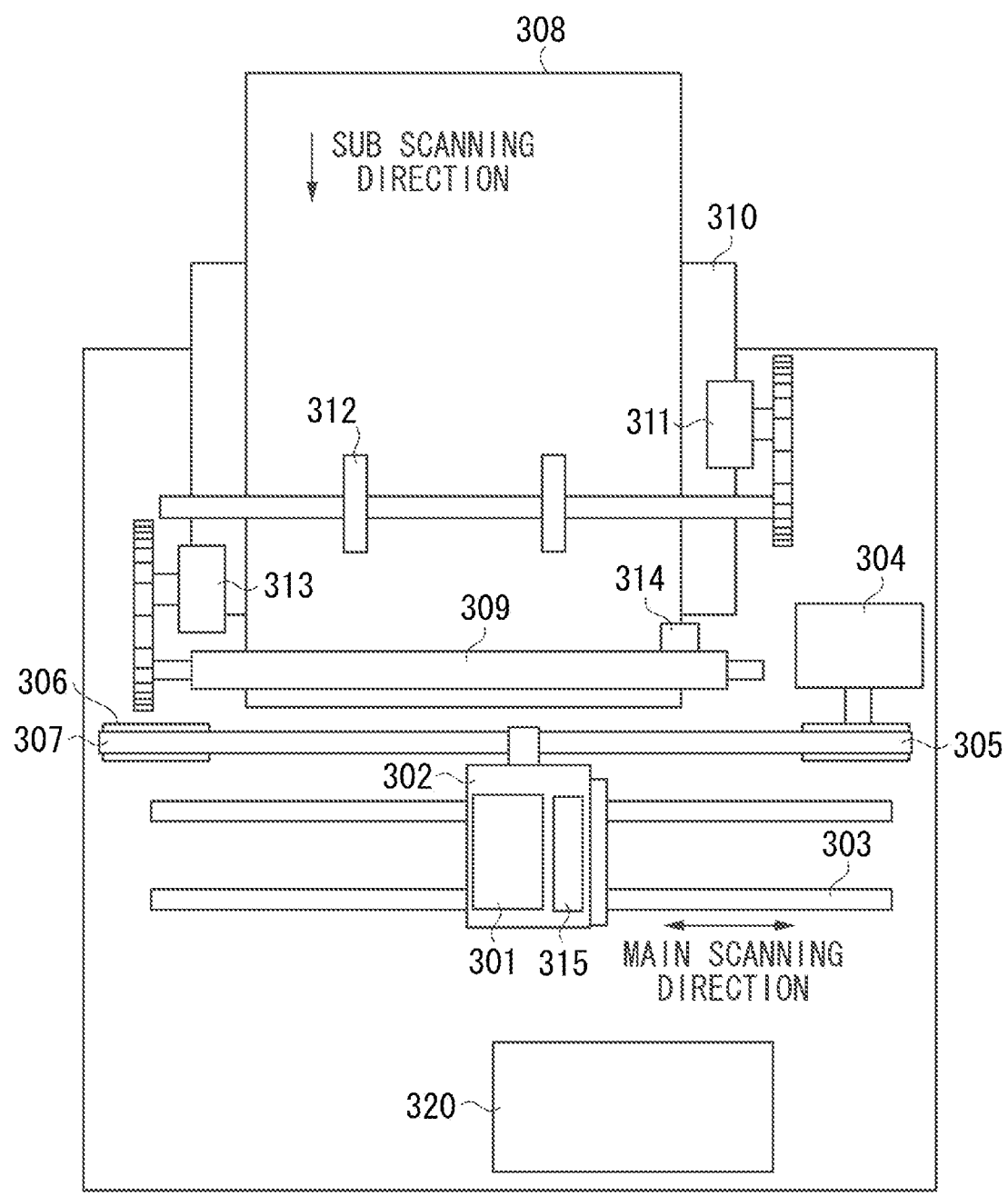
FIG. 3 is a diagram illustrating a configuration of a printer.

A configuration of the printer 14 will be described below with reference to FIG. 3. The printer 14 in the present exemplary embodiment forms an uneven portion and a leveling layer on a recording medium, based on data received from the information processing apparatus 1. An ultraviolet ray (UV) inkjet printer is used as the printer 14. The UV inkjet printer is equipped with ink that is cured by being irradiated with an ultraviolet ray. A head cartridge 301 is provided with a recording head having a plurality of discharge ports, an ink tank that supplies ink to the recording head, and a connector that receives a signal for driving each of the discharge ports of the recording head. The ink tank stores clear ink for forming the uneven portion and the leveling layer. The head cartridge 301 and a UV lamp 315 are each mounted in a carriage 302, in a replaceable manner. The carriage 302 is provided with a connector holder that transmits a signal such as a drive signal to the head cartridge 301 via a connector. The carriage 302 is configured to reciprocate along a guide shaft 303. Specifically, the carriage 302 is driven using a main scanning motor 304 as a drive source, via a drive mechanism including a motor pulley 305, a following pulley 306, and a timing belt 307, and the position and movement thereof are controlled. In the present exemplary embodiment, the movement along the guide shaft 303 of the carriage 302 may be referred to as "main scanning", and the direction of the movement may be referred to as "main scanning direction". Recording media 308 for printing are placed on an automatic sheet feeder (ASF) 310. In formation of the uneven portion on the recording medium 308, a paper feeding motor 311 is driven to rotate a pickup roller 312, and thereby the recording media 308 are separated to be fed one by one by the ASF 310. Further, the recording medium 308 is conveyed to a recording start position by the rotation of a conveyance roller 309. The recording start position faces a discharge-port face of the head cartridge 301 on the carriage 302. The conveyance roller 309 is driven using a line feed motor 313 as a drive source, via a gear. Determination as to whether the recording medium 308 is supplied and determination of a feeding position are performed at the time when the recording medium 308 has passed an end sensor 314. The head cartridge 301 mounted on the carriage 302 is held such that the discharge-port face protrudes downwardly from the carriage 302 to be parallel with the recording medium 308. An operation control unit 320 is configured of components such as a CPU and a storage unit. The operation control unit 320 receives data from outside, and controls the operation of each part, based on the received data. In the present exemplary embodiment, data to be received by the operation control unit 320 is data generated by the information processing apparatus 1 through processing to be described below. The generated data is multi-value image data that represents a dot layout and the number of laminated layers of ink.

Image Forming Operation by Printer 14

The operation control unit 320 controls operation for forming the uneven portion and the leveling layer of each part, and the operation will be described below. First, to form the uneven portion, the carriage 302 moves over the recording medium 308 along the guide shaft 303, when the recording medium 308 is conveyed to the recording start position. During the movement, the clear ink is discharged from the discharge port of the recording head, and the UV lamp 315 is turned on immediately thereafter, so that the ink is cured. When the carriage 302 moves to one end of the guide shaft 303, the conveyance roller 309 conveys the recording medium 308 by a predetermined amount, in a direction perpendicular to the scanning direction of the carriage 302. In the present exemplary embodiment, the conveyance of the recording medium 308 may be referred to as "paper feeding" or "sub scanning", and the direction of the conveyance may be referred to as "paper feeding direction" or "sub scanning direction". Upon completing the conveyance of the recording medium 308 by the predetermined amount in the sub scanning direction, the carriage 302 moves along the guide shaft 303 again. The clear ink can be laminated on the recording medium 308 by repeating the scanning by the carriage 302 of the recording head. The uneven portion is formed on the recording medium 308 by performing lamination of the clear ink and paper feeding alternately. Next, to form the leveling layer on the uneven portion, when the recording medium 308 is returned to the recording start position, the carriage 302 moves over the recording medium 308 along the guide shaft 303 as in the process for forming the uneven portion. During the movement, the clear ink is discharged from the discharge port of the recording head, and the carriage 302 moves to one end of the guide shaft 303 and waits there for a predetermined time. After the waiting, the carriage 302 moves over the recording medium 308 along the guide shaft 303 again, and during the movement, the UV lamp 315 is turned on, so that the ink on the recording medium 308 is cured. An ink layer having a leveled surface can be formed by proving the waiting time from the discharge of the ink to the curing of the ink by the UV exposure. The process for leveling from the discharge to the curing of the ink will be described below. The leveling layer is formed on the uneven portion by performing lamination of the ink layer and paper feeding alternately. In the above-described process for forming the uneven portion, a color image can be formed on the leveling layer, by discharging UV-curable ink of each of cyan (C), magenta (M), yellow (Y), and black (K) colors. In the following, to simplify the description, the recording head of the printer 14 is controlled by two values representing whether the ink drop is discharged. The data to be received by the printer 14 described above holds a pixel value in resolution for controlling discharge (ON)/no-discharge (OFF). The printer 14 is not limited to the above-described operation and recording system as long as the uneven portion and the leveling layer can be formed on the recording medium.

Printout to Be Formed In the Present Exemplary Embodiment

Figure 4A:
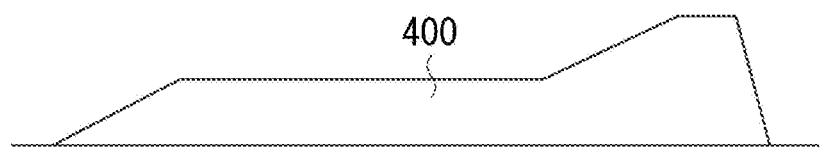
FIGS. 4A, 4B, and 4C are schematic diagrams illustrating an example of a layer structure of an uneven portion formed on a recording medium.
Figure 4B:
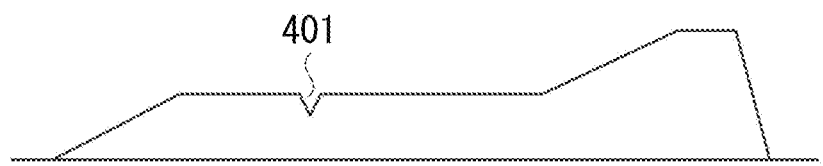
Figure 4C:
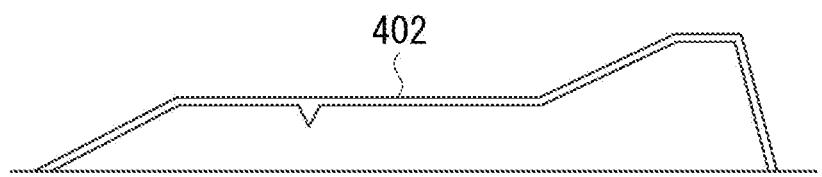

FIGS. 4A, 4B, and 4C each illustrate a sectional schematic diagram of a printout formed through the processing to be described below. FIG. 4A is a schematic diagram of a section of an uneven portion 400 provided as a target for reproduction. A banding 401 in FIG. 4B is a banding generated when the uneven portion is formed. The banding 401 is generated by a nozzle clogging of the recording head or a slight variation in paper feeding pitch. In a case where the banding as illustrated in FIG. 4B is generated, a leveling layer 402 is formed on the formed uneven portion by performing leveling, as illustrated in FIG. 4C. The leveling is to level (smooth) a surface of an uneven portion, by increasing the time from the discharge and landing of ink to the curing of the ink by UV exposure to be longer than that in forming the uneven portion. An effect of the smoothing by increasing the time from the discharge and landing of the ink to the curing of the ink by the UV exposure will be described with reference to schematic diagrams in each of FIGS. 5A and 5B. Schematic diagrams T1 to T3 in FIG. 5A schematically illustrate how an ink drop 500 landed on a recording medium 501 spreads over time. The schematic diagram T1 in FIG. 5A illustrates a surface shape immediately after the landing. The ink drop 500 being wet spreads over time, as indicated by a broken line portion in each of the schematic diagrams T2 and T3 in FIG. 5A, and the surface is thereby leveled. Afterward, the ink is cured by the UV-exposure, and thereby a surface-leveled layer (a leveling layer) 502 can be formed, as indicated by a solid line in the schematic diagram T3. Schematic diagrams T1 to T3 in FIG. 5B illustrate a change in surface shape when a leveling layer is formed on an uneven portion where a banding is generated. FIG. 5B illustrates how a landed ink drop being wet spreads over time before the ink drop is cured, similar to the case in FIG. 5A. The ink drop landed near the banding reduces the banding by entering a groove, as illustrated in the schematic diagrams T1 to T3. Here, the reduction of the banding refers to a decrease in a height h of the banding in the schematic diagram T3.

In general, in multipass recording for performing recording scans for a predetermined region, nonuniformity of paper feeding (sub scanning) is less likely to appear, as the number of recording scans (the number of passes) increases. For this reason, the height of a groove due to a banding is small, and the banding is less likely to be perceived. In addition, because a banding enlarges in proportion to the height of an uneven portion to be formed (the number of lamination times), the banding is more easily perceived in a region where the uneven portion is higher. In the present exemplary embodiment, considering that the perceptibility of the banding depends on the number of passes and the height of the uneven portion, the number of lamination times for forming the leveling layer is determined based on the number of passes in forming the uneven portion and the height of the uneven portion. Specifically, in a case where the number of passes is large or the uneven portion to be formed is low, the leveling layer is formed with a smaller number of lamination times. On the other hand, in a case where the number of passes is small or the uneven portion to be formed is high, the leveling layer is formed with a larger number of lamination times. Therefore, excessive leveling is avoided in a case where the banding is less likely to be perceived, while necessary leveling can be performed in a case where the banding is easily perceived. In other words, it is possible to reduce the time for formation of the uneven portion and the leveling layer, and the cost regarding the consumption of ink and the like. A functional configuration of the information processing apparatus 1 that implements the above-described processing and the details of the processing will be described below.

Functional Configuration of Information Processing Apparatus 1

Figure 2:
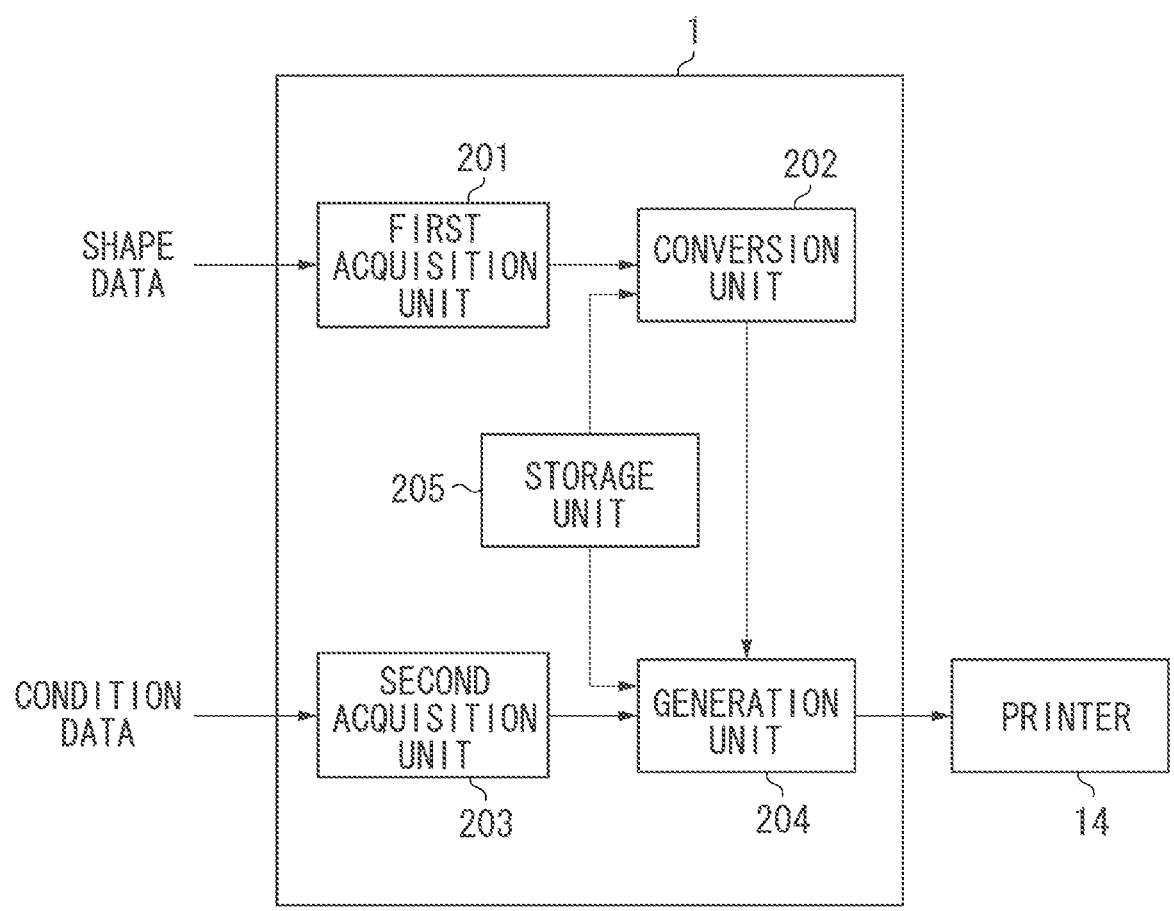
FIG. 2 is a block diagram illustrating a functional configuration of an information processing apparatus.

FIG. 2 is a block diagram illustrating a functional configuration of the information processing apparatus 1 in the present exemplary embodiment. An image processing application included in the above-described various programs executes processing based on an instruction from the CPU 101, and the content of the processing will be described with reference to FIG. 2.

The information processing apparatus 1 has a first acquisition unit 201, a conversion unit 202, a second acquisition unit 203, a generation unit 204, and a storage unit 205. Based on an instruction from a user via the general-purpose I/F 104, the first acquisition unit 201 acquires shape data from various recording media mounted in the HDD 17 and the general-purpose drive 18. The shape data is such data that multi-value information corresponding to the shape of an uneven portion to be formed on a recording medium is recorded for each pixel. In the shape data in the present exemplary embodiment, the height of the uneven portion from a reference surface is recorded for each pixel. Here, the reference surface is a surface of the recording medium. The conversion unit 202 converts the height recorded for each pixel of the shape data into the number of ink lamination times. Based on an instruction from the user via the general-purpose I/F 104, the second acquisition unit 203 acquires condition data that represents a printing condition for formation of the uneven portion by the printer 14. The generation unit 204 generates leveling data for forming a leveling layer. The storage unit 205 stores beforehand various kinds of information including information that represents the thickness of one layer of an ink layer. Processing in each unit will be described in detail below.

Processing To Be Executed By the Information Processing Apparatus 1

Figure 6:
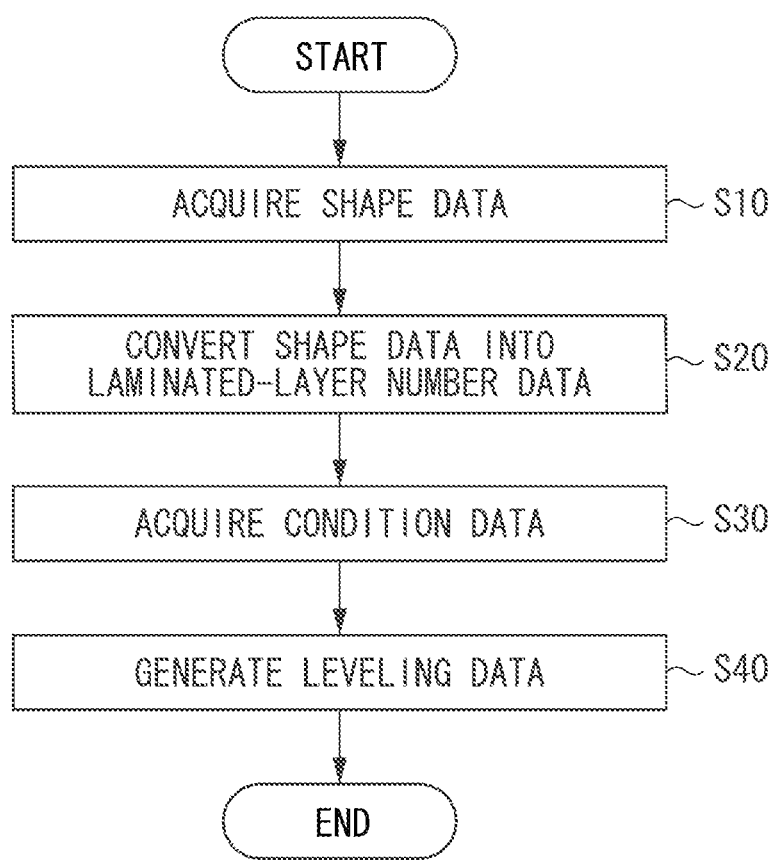
FIG. 6 is a flowchart illustrating processing to be executed by an information processing apparatus.

FIG. 6 is a flowchart illustrating the content of processing to be performed by the information processing apparatus 1 in the present exemplary embodiment. The content of the processing to be performed by the information processing apparatus 1 in the present exemplary embodiment will be described in detail below with reference to FIG. 6. The CPU 101 executes a program code loaded from the ROM 102 into the RAM 103, thereby implementing the processing based on the flowchart in FIG. 6. The CPU 101 receives an instruction input by the user via the input device 13, and thereby starts the flowchart in FIG. 6. In the following, each step (process) will be provided with a numeral prefixed with S.

Figure 7A:
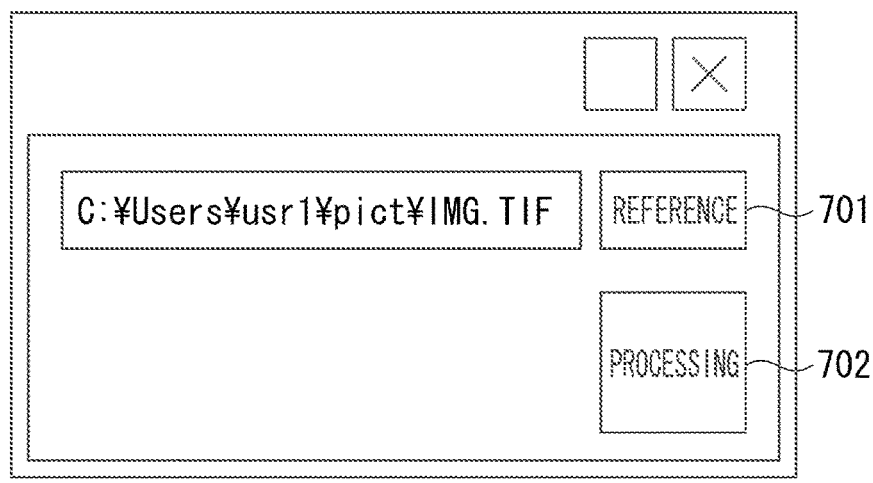
FIGS. 7A, 7B, and 7C are diagrams each illustrating an example of a user interface to be presented to a user.

In step S10, the first acquisition unit 201 acquires shape data. The shape data is recorded in a storage device such as the HDD 17 beforehand. In a case where there is a plurality of pieces of shape data, for example, a UI in FIG. 7A is displayed at the display 15, and thereby the shape data can be acquired based on an instruction received from the user via the input device 13. In the example in FIG. 7A, the user presses a reference button 701 thereby freely selecting shape data. The user subsequently presses a processing button 702, and thereby the first acquisition unit 201 acquires the selected shape data. The processing then proceeds to step S20. Here, the shape data refers to data in which a pixel value indicating height information is recorded for each pixel. The shape data in the present exemplary embodiment is gray-scale image data of one channel in which a pixel value expressed in 8 bits is recorded for each pixel. Specifically, a value normalized to 8 bits (0 to 255) and representing a height of 0 to 2000 μm is recorded for each pixel of the shape data. The shape data is generated beforehand using a known stereo method. The stereo method is a method for acquiring a three-dimensional shape of an object by using the principle of triangulation, based on image data obtained by imaging a reproduction target using two digital cameras arranged on right and left. The shape data may be generated by rendering an uneven portion that is freely designed by the user using a piece of commercially available modeling software, into two-dimensional image data. The shape data is not limited to the above-described data format as long as the shape data is data for forming an uneven portion. For example, relative height information about an uneven portion to be formed may be recorded for each pixel of the shape data. In this case, there may be adopted such a configuration that, based on an uneven-portion maximum height specified by the user via the input device 13, the first acquisition unit 201 converts the relative height information into the height of an uneven portion to be actually formed.

In step S20, the conversion unit 202 performs data conversion for the shape data acquired in step S10, based on the characteristics of the printer 14 that forms an uneven portion. Specifically, the conversion unit 202 converts the height information recorded for each pixel of the shape data into the number of ink lamination times. In the present exemplary embodiment, the thickness of one layer of the ink layer is stored beforehand in the storage unit 205. The height recorded for each pixel is divided by the stored thickness, and thereby the number of lamination times is derived. In a case where the thickness of one layer is 15 μm, the number of lamination times n is calculated by the following expression (1), based on each pixel value p of the shape data acquired in step S10.

$$n=(p\times 2000/255)/15 \tag{1}$$

Here, 2000 is an uneven-portion maximum height, 255 is a maximum value of a value expressed in 8 bits, and 15 is the thickness of one layer. There may be adopted such a configuration that the storage unit 205 stores a table including the number of laminated layers corresponding to each height represented by the shape data, and the conversion unit 202 derives the number of laminated layers by referring to the stored table. The number of laminated layers is recorded for each pixel, in place of the height recorded for each pixel before conversion. Data in which the number of laminated layers is recorded and which is obtained in this step may be referred to below as laminated-layer number data. The laminated-layer number data in which the number of laminated layers is recorded for each pixel may be generated based on the height represented by the shape data, instead of the pixel-value conversion.

Figure 7B:
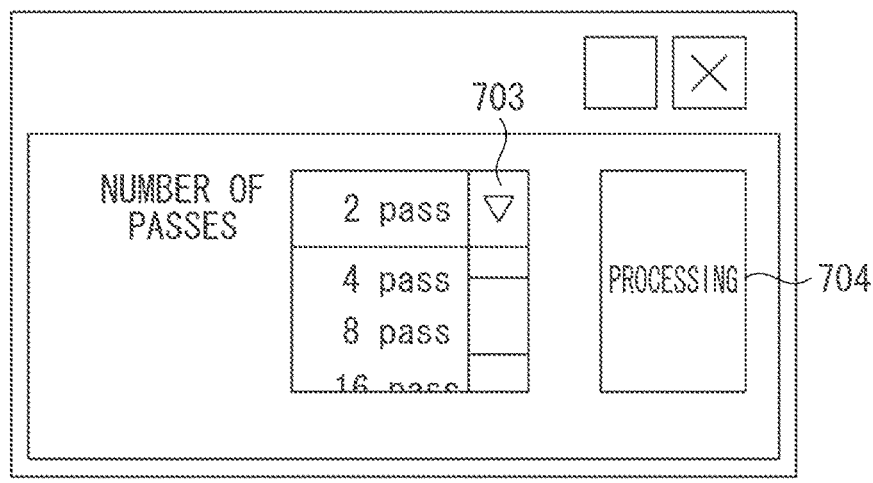
Figure 7C:
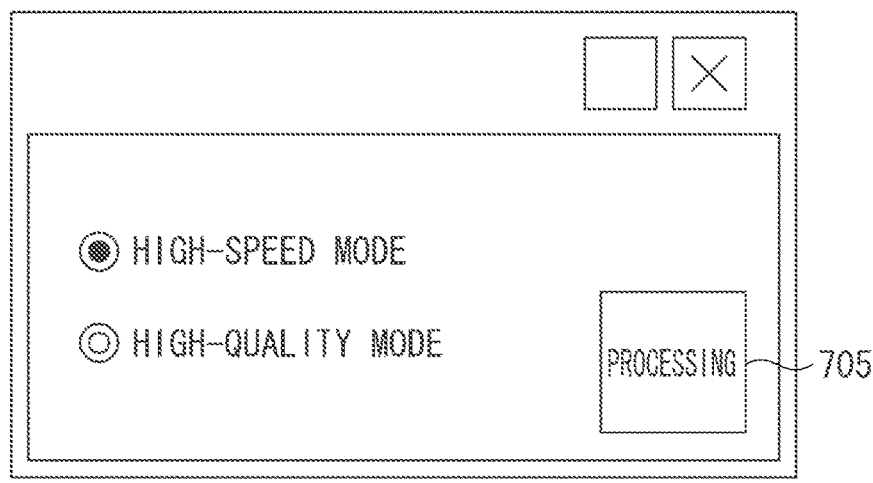

In step S30, the second acquisition unit 203 acquires condition data representing a printing condition for the formation of the uneven portion by the printer 14. The condition data in the present exemplary embodiment represents the number of passes for the formation of the uneven portion by the printer 14. The second acquisition unit 203 displays a UI at the display 15, and acquires the condition data representing the number of passes, based on a user instruction received via the input device 13. FIG. 7B illustrates an example of the UI to be displayed at the display 15. In the UI in FIG. 7B, a list of the numbers of passes appears when a list box 703 is pressed, and the second acquisition unit 203 selects one of the numbers of passes from the list, based on an instruction from the user. Further, in response to the press of a processing button 704, the second acquisition unit 203 records the selected number of passes in the condition data. The processing then proceeds to step S40. As the number of passes increases, a groove due to a banding becomes small, but the time for formation of an uneven portion in step S40 to be described below increases. Therefore, a configuration in FIG. 7C may be adopted. In the configuration, options for a print mode are presented to the user, as a high-speed mode and a high-quality mode. The high-speed mode is a mode in which the number of passes is small, whereas the high-quality mode is a mode in which the number of passes is large. The number of passes is selected according to an input from the user. In a case where the UI in FIG. 7C is used, when a processing button 705 is pressed after either the high-speed mode or the high-quality mode is selected, the number of passes corresponding to the selected mode is recorded in the condition data, and the processing proceeds to step S40. Condition data that represents a predetermined number of passes stored beforehand in the storage unit 205 may be acquired. The processing in this step may be performed before step S10 or before step S20. The processing in step S10 and the processing in step S30 may be performed in parallel, by displaying a UI for acquiring the shape data and the condition data, at the display 15.

Figures 8A, 8B:
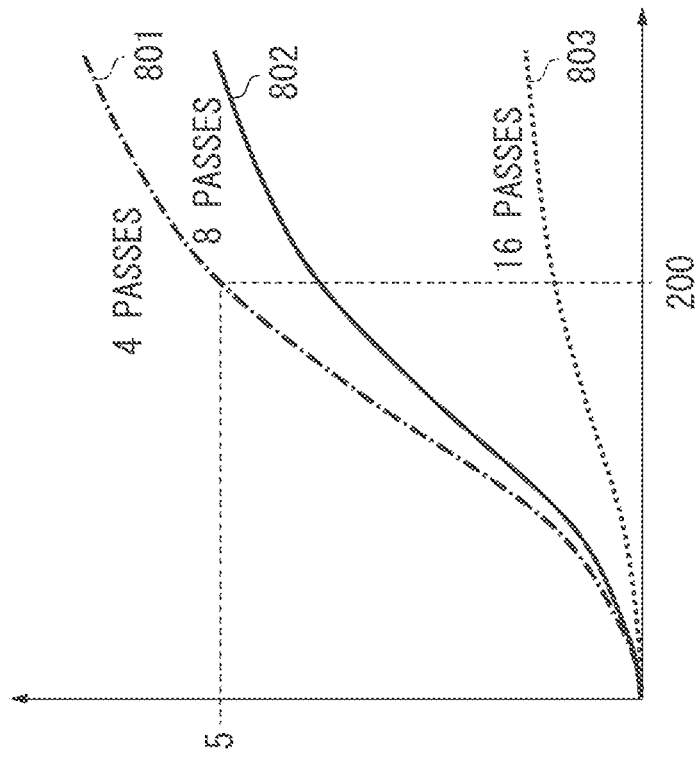
FIGS. 8A and 8B are diagrams illustrating a correspondence relationship between the number of laminated layers of leveling and a printing condition.

In step S40, the generation unit 204 generates leveling data for forming the leveling layer. The leveling data is gray-scale image data of one channel in which the number of lamination times of the leveling layer is recorded for each pixel. A pixel value recorded for each pixel is expressed in 8 bits. The generation unit 204 derives the number of lamination times of the leveling layer, based on information corresponding to the depth of a groove generated on a surface of an uneven portion. In the present exemplary embodiment, the information corresponding to the depth of the groove generated on the surface of the uneven portion is the maximum height of an uneven portion to be formed and the number of passes in forming the uneven portion. To derive the number of lamination times of the leveling layer, a look-up table (LUT) stored in the storage unit 205 beforehand is used. The LUT holds a correspondence relationship between the maximum height as well as the number of passes and the number of laminated layers, and the correspondence relationship will be described with reference to a graph in FIG. 8A. In the graph in FIG. 8A, the horizontal axis represents the maximum height of an uneven portion to be formed, and the vertical axis represents the number of lamination times of a leveling layer. A curve 801, a curve 802, and a curve 803 correspond to 4 passes, 8 passes, and 16 passes, respectively. As illustrated in the graph in FIG. 8A, the higher the maximum height of the uneven portion is or the smaller the number of passes is, the larger the number of leveling layers for inhibiting a banding (for filling a groove by leveling) is. The storage unit 205 stores the LUT in which the above-described correspondence relationship is held, in a data format in FIG. 8B. In the present exemplary embodiment, one number of laminated layers is obtained by using the LUT for all the pixels of the leveling data, and the obtained number of laminated layers is recorded. To generate the LUT, at first, an uneven portion is formed on various conditions included in the first column and the second column. Next, leveling layers are formed one by one on the uneven portion. The height of a banding is measured each time one leveling layer is formed. The number of leveling layers at the time when the measured height is less than or equal to a predetermined threshold is recorded in the third column of the LUT in FIG. 8B. The LUT can be thus generated. A value that is not held in the LUT is derived by known interpolation calculation processing or clipping processing. In consideration of, for example, a reduction in the responsiveness (reproducibility) of the printer 14 to a high-frequency component included in the uneven portion to be formed, or an increase in the time for formation of an image, the number of laminated layers of the leveling layer is desirably less than the number of laminated layers of the uneven portion. In the present exemplary embodiment, when the LUT is generated, 10% of the number of laminated layers (height) of the uneven portion is provided as an upper limit to the number of laminated layers of the leveling layer. There may be adopted such a configuration that the number of laminated layers is derived by a method other than the above-described method. For example, the number of laminated layers may be derived based on only one of the height of the uneven portion to be formed and the number of passes. Alternatively, the number of laminated layers may be derived using an average height of the uneven portion in place of the maximum height of the uneven portion.

In the present exemplary embodiment, the number of laminated layers of the leveling layer is determined, using the number of passes in forming the uneven portion and the height of the uneven portion, as the information corresponding to the depth of the groove generated on the surface of the uneven portion. The information corresponding to the depth of the groove generated on the surface of the uneven portion may be the viscosity of the ink that forms the uneven portion. The depth of the groove is also affected by the viscosity (spreadability in a wet state) of the ink. Specifically, in a case where the viscosity of the ink forming the uneven portion is low, the wet ink easily spreads, and thus the groove is unlikely to occur easily. On the other hand, in a case where the viscosity of the ink forming the uneven portion is high, the wet ink does not easily spread, and thus the groove is deep. Therefore, in a case where the uneven portion is formed using a plurality of types of ink, the number of lamination times of the leveling layer is determined using a table that holds a correspondence relationship between an average viscosity or a maximum viscosity of the plurality of types of ink, and the number of lamination times of the leveling layer. The information corresponding to the depth of the groove generated on the surface of the uneven portion may be a predicted depth of a groove. The predicted depth of the groove may be a measurement result obtained by measuring beforehand the depth of a groove of an uneven portion formed on a recording medium, or may be information input by the user via a UI.

Further, the generation unit 204 outputs data for output to the printer 14. The data for output is generated based on the laminated-layer number data for forming the uneven portion obtained in step S20 and the leveling data for forming the leveling layer generated in this step. Specifically, the generation unit 204 generates recording-amount data that represents a recording amount of the clear ink, based on the laminated-layer number data and the leveling data. Furthermore, the generation unit 204 generates dot-layout data (the data for output) that represents a dot layout of the ink for each recording scan, by performing known quantization processing and path decomposition processing, based on the recording amount of the clear ink. The generated dot-layout data is output to the printer 14. An exposure condition varies depending on whether the dot-layout data is the data for forming the uneven portion or the data for forming the leveling layer. Therefore, information indicating which one of these pieces of data is the dot-layout data is added to the data for output, and the data for output is output to the printer 14. The generation unit 204 may output the laminated-layer number data and the leveling data to another device such as the HDD 17, without performing the known quantization processing and path decomposition processing on these pieces of data. Further, the generation unit 204 may output the dot-layout data to another device such as the HDD 17.

Effects of First Exemplary Embodiment

As described above, the information processing apparatus 1 in the present exemplary embodiment acquires the data having the information corresponding to the depth of the groove generated on the surface of the uneven portion, in a case where the uneven portion is formed on the recording medium. Based on the acquired data, the data representing the number of ink lamination times or the recording amount of the ink for forming the layer of the ink on the uneven portion is generated. Therefore, the groove generated on the surface of the uneven portion can be filled with the leveling layer formed on the uneven portion. Hence, the banding that appears when the uneven portion is formed on the recording medium can be inhibited. Further, the number of lamination times for forming the leveling layer is determined based on the conditions for formation of the uneven portion, such as the number of recording scans in forming the uneven portion, the height of the uneven portion to be formed, and the viscosity of the ink. The leveling appropriate to the degree of the banding can be thereby performed. It is therefore possible to reduce the time for formation of the uneven portion and the leveling layer, and the cost regarding the consumption of ink and the like.

Modifications

Figure 13:
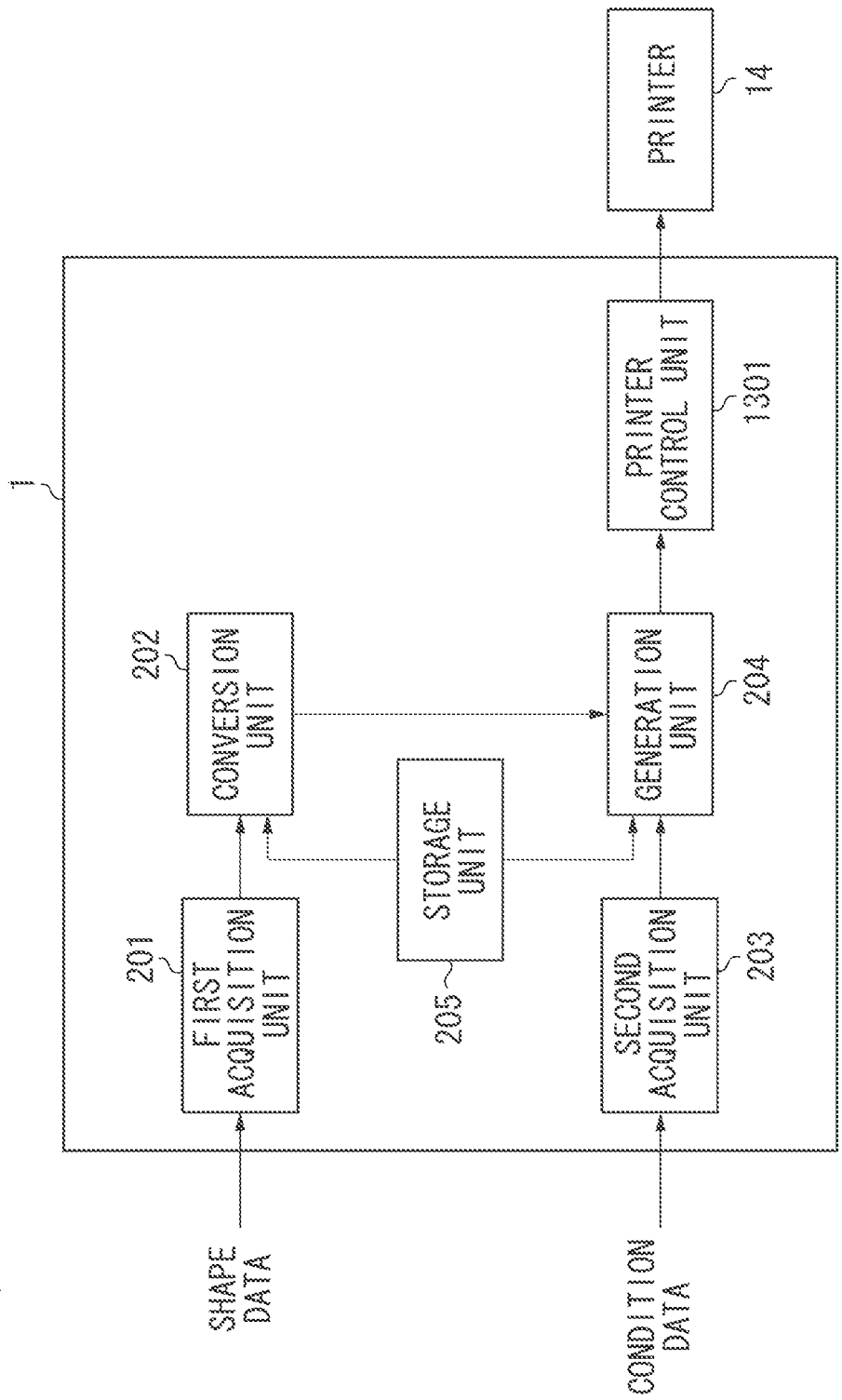
FIG. 13 is a block diagram illustrating a functional configuration of an information processing apparatus.

In the first exemplary embodiment, the processing for generating the laminated-layer number data for forming the uneven portion and the leveling data for forming the leveling layer has been described. The information processing apparatus 1 may further perform processing for forming the uneven portion and the leveling layer on the recording medium, by controlling the printer 14. In this case, as illustrated in FIG. 13, the information processing apparatus 1 further has a printer control unit 1301, and the printer control unit 1301 causes the printer 14 to form the uneven portion and the leveling layer, based on the laminated-layer number data and the leveling data generated by the above-described processing. A step for controlling the formation of the uneven portion may be performed before step S40, or may be performed after step S40. A step for controlling the formation of the leveling layer is performed after the processing in step S40 and the formation of the uneven portion.

A second exemplary embodiment will be described. In the first exemplary embodiment, the leveling layer for reducing the banding is uniformly formed in the entire region where the uneven portion is formed. There is a case where the uneven portion to be formed includes a high-frequency uneven part and a low-frequency uneven part. In this case, if the leveling layer is uniformly formed in the entire region, a detailed shape is lost, which results in a reduction in the responsiveness of the printer 14 to the high-frequency uneven part. Therefore, in the present exemplary embodiment, the shape data representing the shape of the uneven portion is divided into high-frequency shape data representing the shape of a high-frequency component of the uneven portion and low-frequency shape data representing the shape of a low-frequency component of the uneven portion. Based on the high-frequency shape data and the low-frequency shape data, the low-frequency uneven part and the leveling layer are formed, and then the high-frequency uneven part is formed as the uppermost layer. According to the present exemplary embodiment, it is possible to reduce the banding, while suppressing a reduction in the responsiveness of the printer to the high-frequency uneven part. A hardware configuration of an information processing apparatus 1 in the present exemplary embodiment is similar to that in the first exemplary embodiment, and therefore will not be described.

A part of the present exemplary embodiment is different from the first exemplary embodiment, and the part will be mainly described below.

Functional Configuration of Information Processing Apparatus 1

Figure 9:
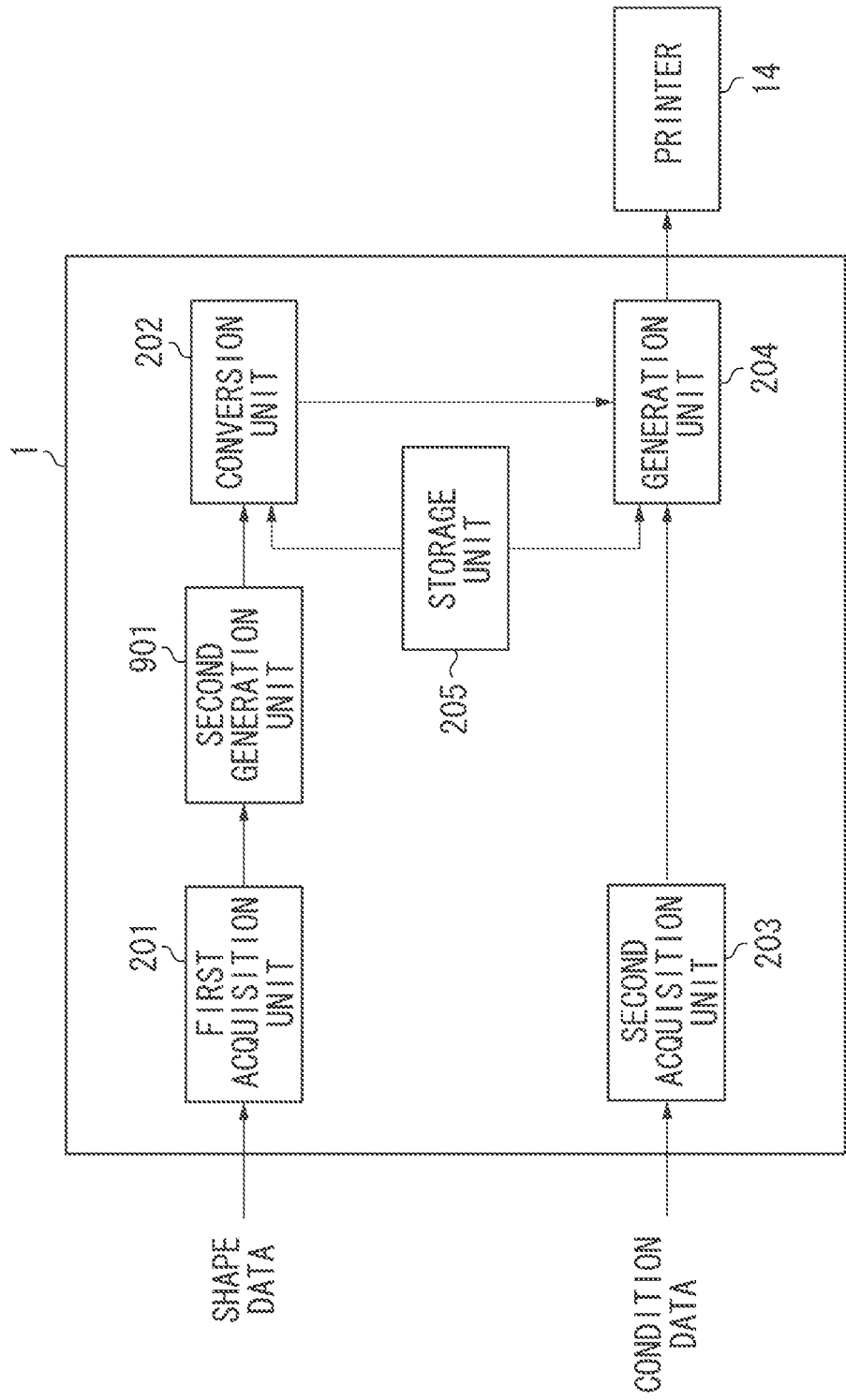
FIG. 9 is a block diagram illustrating a functional configuration of an information processing apparatus.

FIG. 9 illustrates a functional configuration of the information processing apparatus 1 in the present exemplary embodiment. The information processing apparatus 1 has a first acquisition unit 201, a conversion unit 202, a second acquisition unit 203, a generation unit 204, a storage unit 205 and a second generation unit 901. The first acquisition unit 201 to the storage unit 205 in the present exemplary embodiment have functions similar to those of the first acquisition unit 201 to the storage unit 205 in the first exemplary embodiment and therefore will not be described. The second generation unit 901 generates low-frequency shape data representing the shape of a low-frequency component of an uneven portion to be formed and high-frequency shape data representing the shape of a high-frequency component of the uneven portion to be formed, based on the shape data.

Processing To Be Executed By Information Processing Apparatus 1

Figure 10:
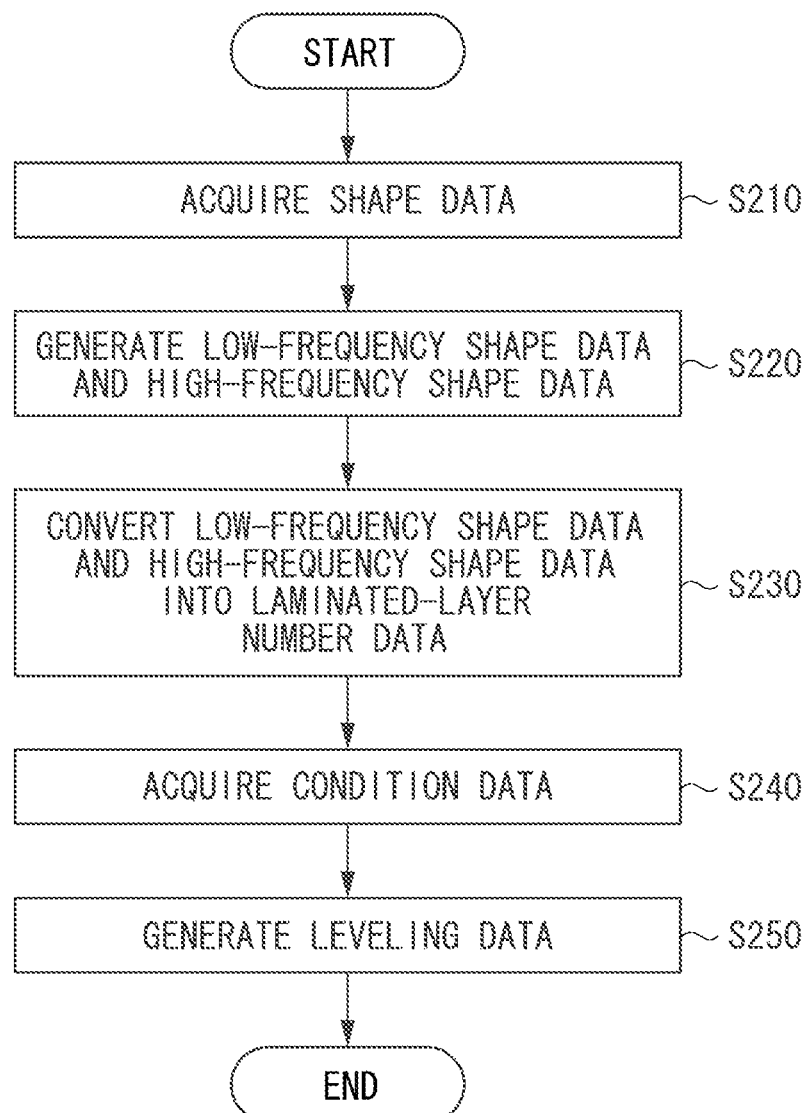
FIG. 10 is a flowchart illustrating processing to be executed by an information processing apparatus.

The content of processing to be performed by the information processing apparatus 1 in the present exemplary embodiment will be described below with reference to a flowchart in FIG. 10.

In step S210, the first acquisition unit 201 acquires shape data, in a manner similar to step S10 in the first exemplary embodiment. In step S220, the second generation unit 901 generates low-frequency shape data and high-frequency shape data by applying a high-pass filter and a low-pass filter to the shape data. The above-described processing is not limitative, if the uneven portion to be formed can be separated into a high-frequency component and a low-frequency component. For example, subtraction processing may be used as follows. First, data is obtained by subjecting the shape data to smoothing processing based on a moving average filter (the low-pass filter), and the obtained data is determined to be the low-frequency shape data. Further, from each pixel value of the shape data, a corresponding pixel value of the low-frequency shape data is subtracted to obtain a pixel-value difference. Data in which the obtained pixel-value difference is recorded for each pixel is determined to be the high-frequency shape data. In a case where a negative value is obtained as the pixel value of the high-frequency shape data by the subtraction processing, all the pixel values are offset in such a manner that the minimum value is 0.

In step S230, the conversion unit 202 converts height information recorded for each pixel of each of the low-frequency shape data and the high-frequency shape data into the number of laminated layers, in a manner similar to step S20 in the first exemplary embodiment. The conversion processing is performed for each of the low-frequency shape data and the high-frequency shape data. In step S240, the second acquisition unit 203 acquires condition data, in a manner similar to step S30 in the first exemplary embodiment. In the present exemplary embodiment as well, condition data representing one number of passes is acquired as in the first exemplary embodiment. The number of passes represented by the acquired condition data is applied to a case where the low-frequency component of the uneven portion is formed and to a case where the high-frequency component of the uneven portion is formed. The number of passes may be set for each of the formation of the low-frequency component and the formation of the high-frequency component. In this case, the effect of suppressing the banding by the leveling layer is not obtained for the high-frequency component of the uneven portion to be formed on the leveling layer. Therefore, it is desirable to set a larger number of passes for the formation of the high-frequency component.

In step S250, in a manner similar to step S40 in the first exemplary embodiment, the generation unit 204 generates leveling data. The generation unit 204 then converts the leveling data, laminated-layer number data corresponding to the low-frequency component, and laminated-layer number data corresponding to the high-frequency component, into data for output, and outputs the data for output to the printer 14. The shape data to be referred to in determination of the number of laminated layers of leveling is the low-frequency shape data.

Effects of Second Exemplary Embodiment

As described above, the information processing apparatus 1 in the present exemplary embodiment separates the uneven portion to be formed, into the low-frequency component and the high-frequency component. The high-frequency component of the uneven portion can be thereby formed on the leveling layer. Therefore, a reduction in the responsiveness of the printer to the high-frequency component due to the leveling can be inhibited, and the banding can be suppressed.

Modifications

In the second exemplary embodiment, the processing for generating the laminated-layer number data for forming the uneven portion and the leveling data for forming the leveling layer has been described. The information processing apparatus 1 may further perform processing for forming the uneven portion and the leveling layer on the recording medium, by controlling the printer 14. In this case, as with the first exemplary embodiment, the information processing apparatus 1 further has a printer control unit, and the printer control unit causes the printer 14 to form the uneven portion and the leveling layer, based on the laminated-layer number data and the leveling data generated by the above-described processing. As for a formation order, the low-frequency uneven part is first formed on the recording medium, and then, the leveling layer is formed on the formed low-frequency uneven part. Further, the high-frequency uneven part is formed on the formed leveling layer.

A third exemplary embodiment will be described. In the second exemplary embodiment, the shape data is separated into the high-frequency shape data and the low-frequency shape data, so that after the low-frequency component of the uneven portion and the leveling layer are formed, the high-frequency component of the uneven portion is formed as the uppermost layer. In the present exemplary embodiment, for an uneven portion to be formed, whether a high-frequency component is included is determined for each region. Based on the result of the determination, a region corresponding to the uneven portion to be formed is segmented into a region including a high-frequency uneven part and a region not including the high-frequency uneven part. The leveling layer is formed in the region other than the region including the high-frequency uneven part. According to the present exemplary embodiment, the leveling layer is locally formed. Therefore, a reduction in the responsiveness of the printer to the high-frequency component due to the leveling can be inhibited, and the banding can be suppressed. Further, because the region for forming the leveling layer can be decreased, the consumption of ink can be reduced. A hardware configuration of the information processing apparatus 1 in the present exemplary embodiment is similar to that in the first exemplary embodiment, and therefore will not be described. A part of the present exemplary embodiment is different from the first exemplary embodiment, and the part will be mainly described below.

Functional Configuration of Information Processing Apparatus 1

Figure 11:
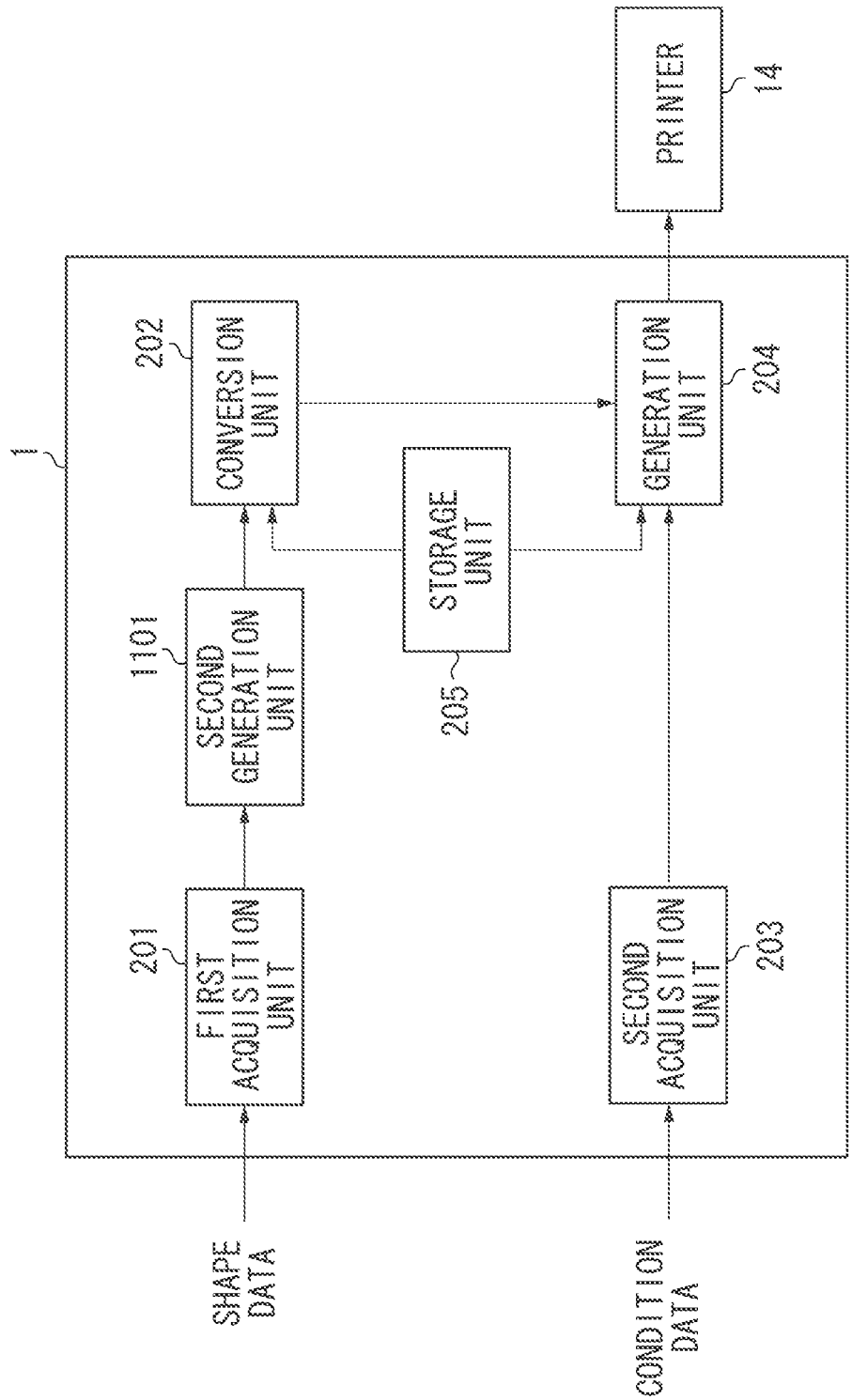
FIG. 11 is a block diagram illustrating a functional configuration of an information processing apparatus.

FIG. 11 illustrates a functional configuration of an information processing apparatus 1 in the present exemplary embodiment. The information processing apparatus 1 has a first acquisition unit 201, a conversion unit 202, a second acquisition unit 203, a generation unit 204, a storage unit 205, and a second generation unit 1101. The first acquisition unit 201 to the storage unit 205 in the present exemplary embodiment have functions similar to those of the first acquisition unit 201 to the storage unit 205 in the first exemplary embodiment and therefore will not be described. The second generation unit 1101 generates high-frequency shape data corresponding to a region including a high-frequency uneven part, and non-high-frequency shape data corresponding to a region not including the high-frequency uneven part, based on shape data.

Processing To Be Executed By Information Processing Apparatus 1

Figure 12:
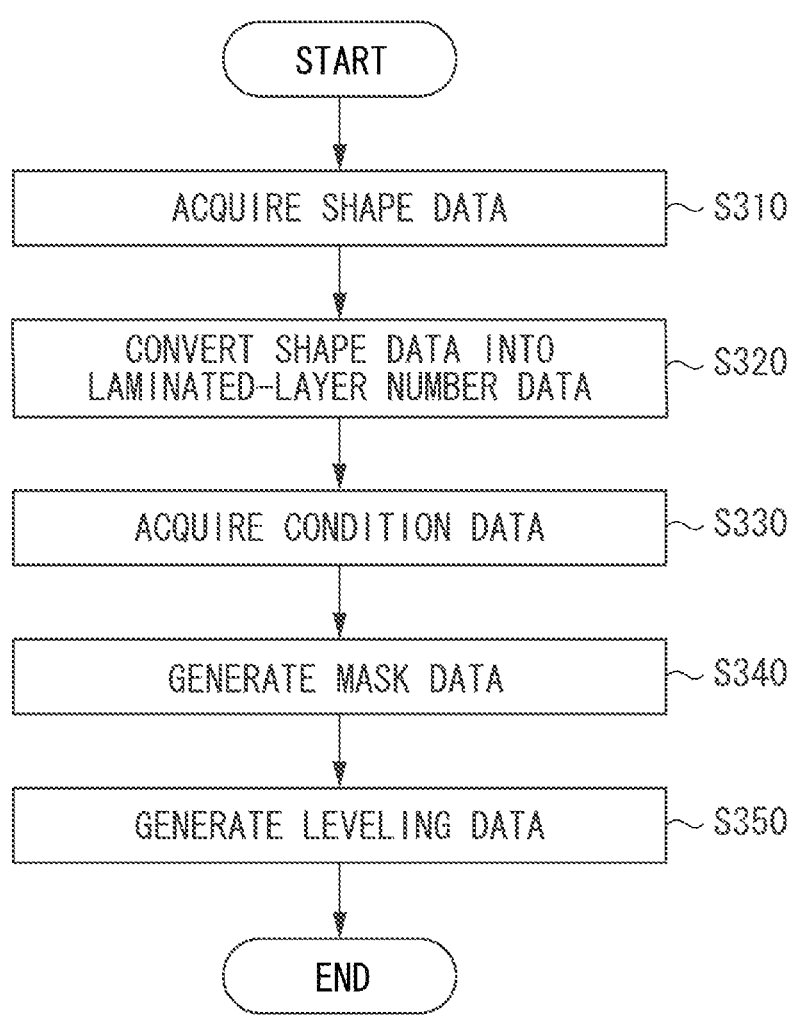
FIG. 12 is a flowchart illustrating processing to be executed by an information processing apparatus.

The content of processing to be performed by the information processing apparatus 1 in the present exemplary embodiment will be described below with reference to a flowchart in FIG. 12.

In step S310 to step S330, the first acquisition unit 201, the conversion unit 202, and the second acquisition unit 203 perform processing similar to that in step S10 to step S30 in the first exemplary embodiment. In other words, the first acquisition unit 201 acquires shape data, and the conversion unit 202 converts the shape data into laminated-layer number data, and the second acquisition unit 203 acquires condition data.

In step S340, the second generation unit 1101 generates mask data for distinguishing between a region for forming a leveling layer and a region for not forming the leveling layer. The region for forming the leveling layer corresponds to a region L having only a low-frequency uneven part, and the region for not forming the leveling layer corresponds to a region H having a high-frequency uneven part. First, the second generation unit 1101 generates high-frequency shape data by using a high-pass filter in a manner similar to the second exemplary embodiment, and performs binarization for the high-frequency shape data by using a predetermined threshold. The binarized high-frequency shape data is subjected to known expansion processing (morphology calculation). A pixel region including an edge nearby can be thereby extracted. In the present exemplary embodiment, the pixel region including the edge nearby is the region having the high-frequency uneven part, and the other region is the region not having the high-frequency uneven part. Performing the expansion processing makes it possible to generate a margin in consideration of spreading of wet ink in leveling, in proximity to the edge of the mask data.

In step S350, based on the mask data, the generation unit 204 generates leveling data to perform the leveling only in the region for forming the leveling layer. The generation unit 204 then converts the leveling data and the laminated-layer number data into data for output, and outputs the data for output to the printer 14. In the leveling data, the number of laminated layers is recorded only for a pixel corresponding to the region for forming the leveling layer, as a pixel value in the mask data, and 0 is recorded for the other pixels. A method for generating the leveling data is similar to the method in step S40 in the first exemplary embodiment.

Effects of Third Exemplary Embodiment

As described above, the information processing apparatus 1 in the present exemplary embodiment subjects the shape data to the region segmentation, and generates the leveling data to form the leveling layer locally. Therefore, a reduction in the responsiveness of the printer to the high-frequency component due to the leveling can be inhibited, and the banding can be suppressed. Further, because the region for forming the leveling layer can be decreased, the consumption of ink can be reduced.

Modifications

In the third exemplary embodiment, the processing for generating the laminated-layer number data for forming the uneven portion and the leveling data for forming the leveling layer has been described. The information processing apparatus 1 may further perform processing for forming the uneven portion and the leveling layer on the recording medium, by controlling the printer 14. In this case, as with the first exemplary embodiment, the information processing apparatus 1 further has a printer control unit, and the printer control unit causes the printer 14 to form the uneven portion and the leveling layer, based on the laminated-layer number data and the leveling data generated by the above-described processing. A step for controlling the formation of the uneven portion is performed after step S320, and a step for controlling the formation of the leveling layer is performed after step S350 and after the uneven portion is formed.

Other Exemplary Embodiments

In the above-described exemplary embodiments, both of the uneven portion and the leveling layer are formed. However, the leveling may be performed on an uneven portion formed beforehand on a recording medium. In this case, it is not necessary to acquire the shape data and to generate the laminated-layer number data for forming the uneven portion, and processing for generating the leveling data based on the acquired condition data may be performed.

In the above-described exemplary embodiments, the data that represents the number of laminated layers for forming each of the uneven portion and the leveling layer is generated. However, the data for forming the uneven portion and the leveling data is not limited to the above-described example. For example, the data may be recording-amount data that represents the recording amount of the ink, or may be dot-layout data that represents the dot layout of the ink.

In the above-described exemplary embodiments, the LUT is used to form the leveling layer. The LUT holds the correspondence relationship between the maximum height of the uneven portion as well as the number of passes and the number of laminated layers of the leveling layer. However, the LUT is not limited to the above-described example. For example, the LUT may be a LUT that holds a correspondence relationship between the maximum height of the uneven portion as well as the number of passes and a recording amount for recording the leveling layer.

In the above-described exemplary embodiments, the configuration for reproducing only the uneven portion by using the printer 14 has been described. However, a configuration for reproducing a color image and a gloss image in addition to the uneven portion may be adopted. For example, color image data is acquired as with the shape data, and a color image represented by the color image data is subjected to known image processing such as color separation and quantization processing. Based on dot-layout data of color ink obtained as the result of the image processing, the printer 14 forms a color image on the leveling layer. In this case, the printer 14 is equipped with ink of four colors of cyan, magenta, yellow, and black. The color ink is not limited to the above-described colors. The printer 14 may be equipped with ink of other colors such as light cyan, light magenta, red, blue, and green.

In the above-described first exemplary embodiment, the derived number of laminated layers is recorded for all the pixels of the leveling data. However, for example, there may be adopted such a form that the number of laminated layers is recorded for pixels in such a manner that an implantation amount corresponds to an area ratio of 70%, in consideration of the spread of the wet ink drop. In this case, it is possible to apply a known halftone (HT) processing technology based on an implantation amount, such as a known error diffusion method.

In the above-described exemplary embodiments, the configuration for forming the leveling layer based on a printing condition that is the same as the printing condition for forming the uneven portion has been described. However, the number of passes or the recording start position in forming the leveling layer may be set to be different from that in forming the uneven portion. The phase (position) of a banding generated in the uneven portion and that in the leveling layer do not overlap each other, by setting the number of passes or the recording start position in forming the leveling layer to be different from that in forming the uneven portion. It is therefore possible to avoid a situation where the ink drop 500 for filling the groove becomes loose in proximity to the banding and thereby fails to fill the groove as illustrated in FIG. 5B.

In the above-described third exemplary embodiment, the method for locally forming the leveling layer by segmenting the region of the uneven portion to be formed into two has been described. However, the region of the uneven portion to be formed may be segmented into three or more, and the leveling layer may be formed with the number of laminated layers different for each of the regions. For example, the following configuration is conceivable. In addition to a region L and a region H set in a manner similar to the third exemplary embodiment, a region B where appearance of a banding is predicted is set beforehand, and a region where the region H and the region B overlap each other is provided as a region HB. The leveling layer is formed in each of the region HB, the region H, and the region L. The numbers of laminated layers of the respective leveling layers are 2×n, n, and 0, for the region HB, the region H, and the region L, respectively. It is also possible to adopt such a configuration that the number of laminated layers (height) of the uneven portion is referred to for each region, and the number of laminated layers of the leveling layer is changed depending on the number of laminated layers.

In the above-described exemplary embodiments, the clear ink is used for the formation of both of the leveling layer and the uneven portion, but another ink such as white ink may be used. For example, the uneven portion may be formed using a plurality of types of ink to reproduce the height of the uneven portion in a short time. Alternatively, the uneven portion may be formed using low-cost ink or ink of a large remaining amount. In a case where the uneven portion is formed using color ink, color reproduction can be prevented by covering the top with white ink. However, it is desirable to use ink of the same color for the formation of the leveling layer and the formation of the uneven portion, in order to avoid perception of the boundary between the leveling layer and the uneven portion.

In the above-described exemplary embodiments, the UV exposure condition varies between the case where the uneven portion is formed and the case where the leveling layer is formed. However, a difference in spreading in a wet state depending on the viscosity of the ink may be used for the formation of the leveling layer. For example, ink having a viscosity lower than that of ink for forming the uneven portion may be used as ink for forming the leveling layer. This enables formation of a smooth surface where the banding is inhibited, even if the exposure condition does is not varied.

According to the exemplary embodiments of the present disclosure, it is possible to inhibit a banding that appears when an uneven portion is formed on a recording medium.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-243380, filed Dec. 20, 2017, which is hereby incorporated by reference herein in its entirety.

What is claimed is:

1. An information processing apparatus that generates data for forming a layer of ink to be cured by being irradiated with an ultraviolet ray, on an uneven portion formed on a recording medium using ink to be cured by being irradiated with an ultraviolet ray, the information processing apparatus comprising:
   an acquisition unit configured to acquire first data that has information corresponding to a depth of a groove to be generated on a surface of the uneven portion in a case where the uneven portion is formed on the recording medium; and
   a generation unit configured to generate second data that represents a number of lamination times of ink or a recording amount of ink for forming the layer of ink, based on the first data,
   wherein the layer of ink is a layer to be formed based on a condition that an elapsed time from discharge to curing of ink is longer than an elapsed time from discharge to curing of ink in a case where the uneven portion is formed.

2. The information processing apparatus according to claim 1,
   wherein the information corresponding to the depth of the groove generated on the surface of the uneven portion is at least one of a number of recording scans to be performed for a predetermined region on the recording medium to form the uneven portion, a height of the uneven portion, and a viscosity of the ink to be used to form the uneven portion, and
   wherein the generation unit generates the second data, based on at least one of the number of recording scans, the height of the uneven portion, and the viscosity.

3. The information processing apparatus according to claim 2,
   wherein the acquisition unit acquires the first data that represents the number of recording scans and the height of the uneven portion, and
   wherein the generation unit generates the second data, based on the number of recording scans and the height of the uneven portion.

4. The information processing apparatus according to claim 3, wherein, in a case where the number of recording scans is large and the height of the uneven portion is low, the recording amount of ink for forming the layer of ink is less than the recording amount of ink in a case where the number of recording scans is small and the height of the uneven portion is high.

5. The information processing apparatus according to claim 3, wherein the generation unit generates the second data, by using a table that holds a correspondence relationship of the number of recording scans and the height of the uneven portion, to the number of lamination times of ink or the recording amount of ink for forming the layer of ink.

6. The information processing apparatus according to claim 2,
   wherein the acquisition unit acquires the first data that represents the number of recording scans, and
   wherein the generation unit generates the second data, based on the number of recording scans.

7. The information processing apparatus according to claim 6, wherein, in a case where the number of recording scans is large, the recording amount of ink for forming the layer of ink is less than the recording amount of ink in a case where the number of recording scans is small.

8. The information processing apparatus according to claim 6, wherein the generation unit generates the second data, by using a table that holds a correspondence relationship between the number of recording scans and the number of lamination times of ink or the recording amount of ink for forming the layer of ink.

9. The information processing apparatus according to claim 1, wherein the ink for forming the uneven portion and the ink for forming the layer of ink are same ink.

10. The information processing apparatus according to claim 9, wherein the ink for forming the uneven portion and the ink for forming the layer of ink are clear ink.

11. The information processing apparatus according to claim 1, wherein a recording amount of the ink for forming the uneven portion is more than the recording amount of ink for forming the layer of ink.

12. The information processing apparatus according to claim 1,
   wherein the acquisition unit acquires the first data that represents a height of the uneven portion, and
   wherein the generation unit generates the second data, based on the height of the uneven portion.

13. The information processing apparatus according to claim 12, wherein, in a case where the height of the uneven portion is low, the recording amount of ink for forming the layer of ink is less than in a case where the height of the uneven portion is high.

14. The information processing apparatus according to claim 12, wherein the generation unit generates the second data, by using a table that holds a correspondence relationship between the height of the uneven portion and the number of lamination times of ink or the recording amount of ink for forming the layer of ink.

15. The information processing apparatus according to claim 1, further comprising a second acquisition unit configured to acquire mask data for distinguishing between a region corresponding to a high-frequency component of the uneven portion and a region corresponding to a low-frequency component of the uneven portion,
   wherein the generation unit generates the second data for forming the layer of ink on the region corresponding to the low-frequency component of the uneven portion, based on the mask data.

16. The information processing apparatus according to claim 1, further comprising a control unit configured to control a printer to form the layer of ink on the uneven portion based on the second data.

17. The information processing apparatus according to claim 1, wherein a high-frequency component of the uneven portion is formed on the layer of ink.

18. An image forming apparatus that forms a layer of ink to be cured by being irradiated with an ultraviolet ray, on an uneven portion formed on a recording medium using ink to be cured by being irradiated with an ultraviolet ray, the image forming apparatus comprising:
   an acquisition unit configured to acquire data that represents a number of recording scans to be performed for a predetermined region on the recording medium to form the uneven portion; and
   a forming unit configured to form the layer of ink based on the data, wherein the forming unit varies a number of recording scans to be performed for a predetermined region on the uneven portion to form the layer of ink, between a case where the number of recording scans represented by the data is a first number of times, and a case where the number of recording scans represented by the data is a second number of times different form the first number of times.

19. An information processing method for generating data for forming a layer of ink to be cured by being irradiated with an ultraviolet ray, on an uneven portion formed on a recording medium using ink to be cured by being irradiated with an ultraviolet ray, the information processing method comprising:

acquiring first data that has information corresponding to a depth of a groove to be generated on a surface of the uneven portion in a case where the uneven portion is formed on the recording medium; and generating second data that represents a number of lamination times of ink or a recording amount of ink for forming the layer of ink, based on the first data, wherein the layer of ink is a layer to be formed based on a condition that an elapsed time from discharge to curing of ink is longer than an elapsed time from discharge to curing of ink in a case where the uneven portion is formed.

20. A non-transitory computer-readable storage media storing instructions that, when executed by a computer, cause the computer to perform an information processing method for generating data for forming a layer of ink to be cured by being irradiated with an ultraviolet ray, on an uneven portion formed on a recording medium using ink to be cured by being irradiated with an ultraviolet ray, the information processing method comprising:

acquiring first data that has information corresponding to a depth of a groove to be generated on a surface of the uneven portion in a case where the uneven portion is formed on the recording medium; and generating second data that represents a number of lamination times of ink or a recording amount of ink for forming the layer of ink, based on the first data, wherein the layer of ink is a layer to be formed based on a condition that an elapsed time from discharge to curing of ink is longer than an elapsed time from discharge to curing of ink in a case where the uneven portion is formed.

* * * * *